United States Patent
Pan et al.

(10) Patent No.: US 8,396,330 B2
(45) Date of Patent: Mar. 12, 2013

(54) IMAGE UPSCALING BASED UPON DIRECTIONAL INTERPOLATION

(75) Inventors: Hao Pan, Camas, WA (US); Petrus J. L. Van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1052 days.

(21) Appl. No.: 11/904,966

(22) Filed: Sep. 28, 2007

(65) Prior Publication Data

US 2009/0028464 A1     Jan. 29, 2009

Related U.S. Application Data

(60) Provisional application No. 60/961,955, filed on Jul. 24, 2007.

(51) Int. Cl.
*G06K 9/46* (2006.01)
*H04N 7/46* (2006.01)
*G06T 3/40* (2006.01)

(52) U.S. Cl. ........ 382/300; 382/181; 382/199; 382/205; 382/266; 358/3.15; 358/525

(58) Field of Classification Search .................. 382/300, 382/181, 199, 205, 266; 358/525, 3.15
See application file for complete search history.

(56) References Cited

U.S. PATENT DOCUMENTS

| | | | |
|---|---|---|---|
| 5,054,100 A * | 10/1991 | Tai | 382/300 |
| 5,444,487 A | 8/1995 | Kondo et al. | |
| 5,666,164 A | 9/1997 | Kondo et al. | |
| 6,323,905 B1 | 11/2001 | Kondo et al. | |
| 6,408,109 B1 * | 6/2002 | Silver et al. | 382/300 |
| 6,434,280 B1 | 8/2002 | Peleg et al. | |
| 6,466,702 B1 | 10/2002 | Atkins et al. | |
| 6,535,651 B1 * | 3/2003 | Aoyama et al. | 382/300 |
| 6,690,842 B1 * | 2/2004 | Silver et al. | 382/300 |
| 6,766,067 B2 | 7/2004 | Freeman et al. | |
| 6,766,068 B2 * | 7/2004 | Aoyama et al. | 382/300 |
| 6,928,196 B1 * | 8/2005 | Bradley et al. | 382/300 |
| 7,106,914 B2 | 9/2006 | Tipping et al. | |
| 7,215,831 B2 | 5/2007 | Altunbasak et al. | |
| 7,218,796 B2 | 5/2007 | Bishop et al. | |

(Continued)

FOREIGN PATENT DOCUMENTS

| JP | 4-129284 | 4/1992 |
|---|---|---|
| JP | 11-514810 | 12/1999 |

(Continued)

OTHER PUBLICATIONS

Frank M. Candocia & Jose C. Principe, "A Neural Implementation of Interpolation with a Family of Kernels," Proc. of the International Conference on Neural Networks, 1997, (ICNN 97), vol. III, pp. 1506-1511.

(Continued)

*Primary Examiner* — Michael A Newman
(74) *Attorney, Agent, or Firm* — Chernoff Vilhauer McClung & Stenzel, LLP

(57) ABSTRACT

A method for interpolation includes receiving an input image having a plurality of pixels. The edge direction proximate a first pixel of the input image is estimated using a first technique from a plurality of discrete potential directions. An edge direction is selected based upon the estimating the edge direction proximate the first pixel of the input image using a second technique. The pixels proximate the first pixel are interpolated based upon the selected edge direction. The pixels proximate the first pixel are interpolated based upon another technique. An output image is determined.

20 Claims, 13 Drawing Sheets

U.S. PATENT DOCUMENTS

| | | | |
|---|---|---|---|
| 7,239,428 B2 | 7/2007 | Solecki | |
| 7,292,738 B1* | 11/2007 | Ma et al. | 382/300 |
| 7,391,920 B2* | 6/2008 | Abe | 382/266 |
| 7,796,191 B1* | 9/2010 | Vojkovich | 348/448 |
| 2006/0244861 A1* | 11/2006 | Lertrattanapanich et al. | 348/448 |
| 2006/0290950 A1 | 12/2006 | Platt et al. | |
| 2006/0291741 A1* | 12/2006 | Gomi et al. | 382/266 |

FOREIGN PATENT DOCUMENTS

| | | |
|---|---|---|
| JP | 2002-024815 | 1/2002 |
| JP | 2003-174557 | 6/2003 |
| WO | WO 03/102868 | 12/2003 |

OTHER PUBLICATIONS

Frank M. Candocia & Jose C. Principe, "Superresolution of Images Based on Local Correlations," IEEE Transactions on Neural Networks, vol. 10, No. 2, pp. 372-380, Mar. 1999.

Office Action in Chinese App. No. 200880025100.2, Sharp Kabushiki Kaisha, dated May 18, 2011, 19 pgs., including English translation.

* cited by examiner

US 8,396,330 B2

IMAGE UPSCALING BASED UPON DIRECTIONAL INTERPOLATION

CROSS-REFERENCE TO RELATED APPLICATIONS

This application claims the benefit of U.S. Provisional App. No. 60/961,955, filed Jul. 24, 2007.

BACKGROUND OF THE INVENTION

The present invention relates to image upscaling based upon directional interpolation.

Digital video is typically represented as a series of images or frames, each of which contains an array of pixels. Each pixel includes information, such as intensity and/or color information. In many cases, each pixel is represented as a set of three colors, each of which is defined by eight bit color values.

Pixel information within a frame may be missing such as boundary conditions that may result when executing a video conversion process, such as the conversion between interlaced television field signals and progressive frame signals. In other cases, a frame may be at a first resolution, such as standard definition, which is desirable to convert to a second resolution, such as high definition.

Standard techniques for pixel interpolation are based on application of classical linear filters. However, such techniques introduce various visual artifacts such as blurring of sharp edge patterns and detailed texture patterns in the image, ringing along edge contours, as well jaggedness along edge contours. Such artifacts generally cannot be avoided when standard linear filtering techniques are used for interpolation. Therefore, there is a need for improved techniques for pixel interpolation, such as techniques that are adaptive to local image patterns.

An improved technique for pixel interpolation is generally referred to as an edge-directed interpolation which seeks to generate a value for a missing pixel by extending the patterns in selected directions, expressed as edges which exist in the surrounding pixels of an image frame.

Unfortunately, it is difficult to determine the existence of an edge in an image and the direction of such an edge in an image. Erroneous estimates of the direction can lead to new visual artifacts in the image after interpolation. Therefore, there is a need for a robust technique for estimating the direction of a local edge pattern in an image. Furthermore, there is need for a robust image upscaling technique that considers the possibility of erroneous estimates of the direction, to avoid any visual artifacts. Furthermore, there is a need for an image upscaling technique with low computational complexity that can outperform standard linear filtering techniques in terms of visual quality.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
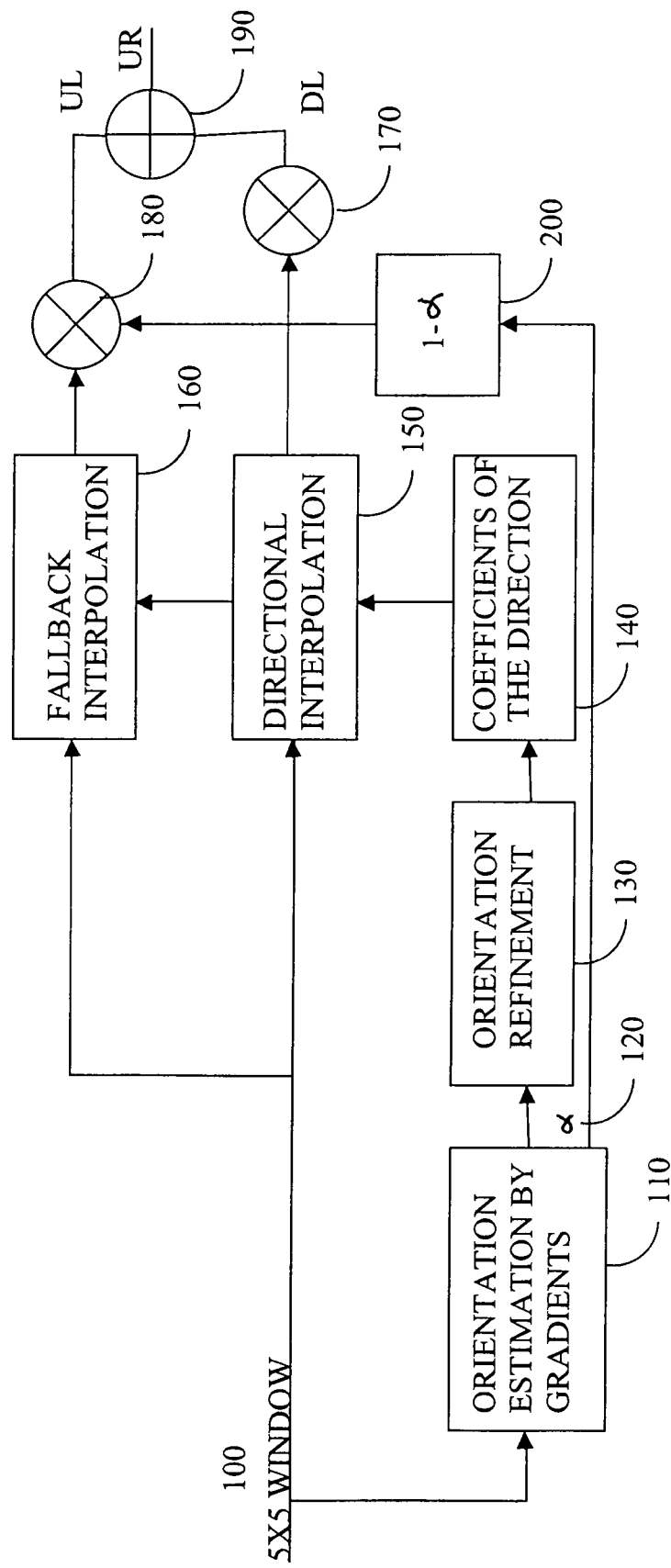
FIG. 1 is a block diagram of an image upscaling technique.

Referring to FIG. 1, an image upscaling technique includes directional based interpolation. The technique includes a window of image pixels 100 such as a 5 by 5 set of pixels (25 total pixels). Preferably the image upscaling technique is applied to each pixel of the image, with the 5 by 5 window of pixels being sequentially centered around each pixel of the image, such as in a raster scan fashion. The upscaling technique preferably estimates the edge orientation of the central pixel of the 5 by 5 window based upon the luminance Y component of the color image, even if no edge exists in the window. For example, Y can be calculated from RGB using the definition by CCIR709=0.2126R+0.7152G+0.0722B. The window of image pixels 100 is preferably moved around the image in a predefined manner such that the input image containing M×N pixels results in an output image of 2M×2N pixels. It is noted that a larger or smaller window of pixels may alternatively be used. A preferred window is a square window of pixels. It is also noted that a window with other shapes may alternatively be used, such as a rectangular window, or a diamond shaped window, or octagonal shaped window, and so forth.

The 5 by 5 window is used to determine the orientation (direction) of an edge at or near the central pixel. The orientation estimation 110 of the edges may use any suitable technique, such as using a gradient technique. A reliability measure 120 may be determined which estimates the likelihood that the orientation estimation 110 has determined an actual edge. The output of the orientation estimation 110 may be refined by an orientation refinement 130. The orientation refinement 130 may use a different technique from the orientation estimation 110 to select from among the best candidate(s) from the orientation estimation 110. The orientation refinement 130 reduces the likelihood of the orientation estimation 110 being in error as a result of local minimums in the estimation process.

The orientation refinement 130 is used to generate the coefficients of the direction 140. The coefficients of the direction 140 are used with a directional interpolation 150 to generate a set of one or more interpolated pixels in the 5 by 5 window. In some cases, the directional interpolation 150 does not provide accurate results, such as in the case that there is no defined edge within the 5 by 5 window. To upscaling technique may provide a fallback interpolation 160 that is not based to such a degree upon the determination of edges, described later.

Using the reliability measure 120 as a basis for determining an appropriate output, the fallback interpolation 160 may be multiplied by 1 minus the reliability measure 200 which is added 190 to the directional interpolation 150 multiplied by the reliability measure. In this manner, the output is a combination of the directional interpolation 150 and the fallback interpolation 160.

Figure 2:
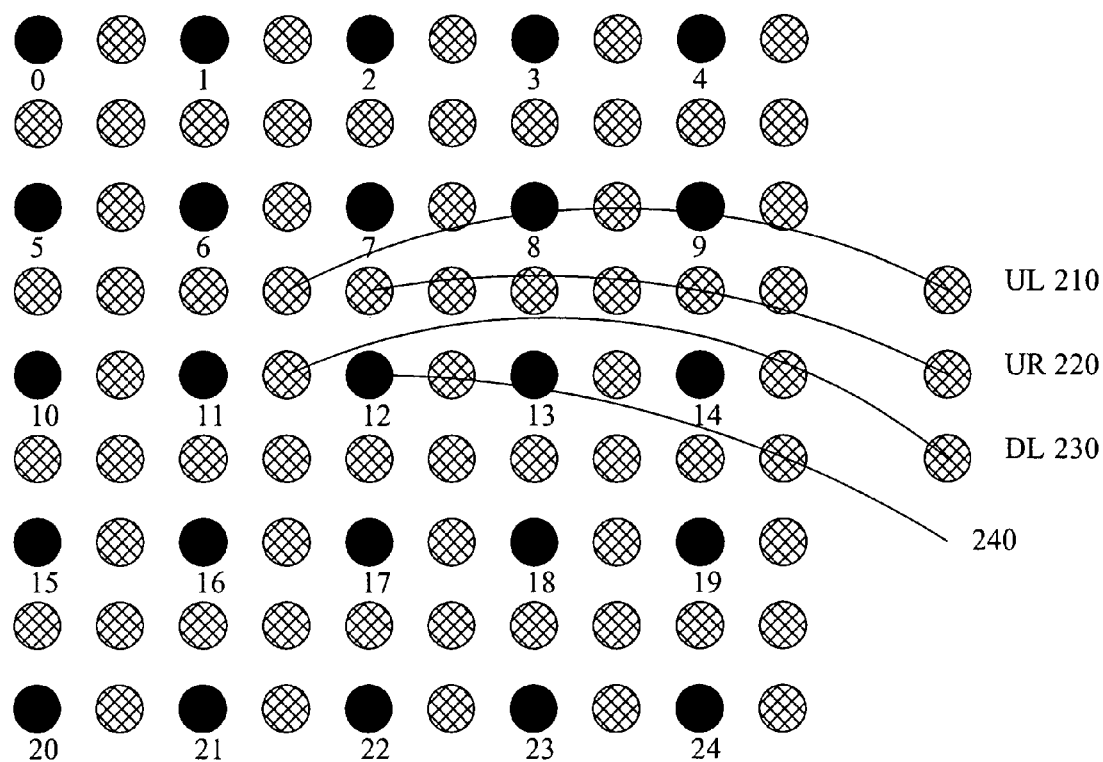
FIG. 2 illustrates a 5 by 5 window and three new pixels that are interpolated from the window.

Referring to FIG. 2, the orientation estimation 110 using gradients may estimate three new pixels ul 210, ur 220, and dl 230 around the center pixel 240. Where ul 210 represents upper left, ur 220 represents upper right, and dl 230 represents down left. The numbered pixels 0, 1, 2, 3, 4, 5, 6, 7, 8, 9, 10, 11, 12, 13, 14, 15, 16, 17, 18, 19, 20, 21, 22, 23, 24 are pixels in the input image. The other pixels are the interpolated pixels. The technique may quantize the edge orientation into a plurality of different directions to make a determination of where the edge may exist, if any. The quantization may include coefficients (most of them are preferably zero) for performing the interpolation along the edge orientation, not across the edge orientation.

The plurality of different directions may include, for example, 10 different directions defined as, −45 degrees, −26.6 degrees, −18.4 degrees, +18.4 degrees, +26.6 degrees, +45 degrees, +63.4 degrees, +71.6 degrees, +108.4 degrees, and +116.6 degrees. Each direction may be indexed with an index from 0 to 9, with direction with index 0 corresponding to −45 degrees, with index 1 corresponding to −26.6 degrees, with index 2 corresponding to −18.4 degrees, with index 3 corresponding to +18.4 degrees, with index 4 corresponding to +26.6 degrees, with index 5 corresponding to +45 degrees, with index 6 corresponding to +63.4 degrees, with index 7 corresponding to +71.6 degrees, with index 8 corresponding to +108.4 degrees, and with index 9 corresponding to +116.6 degrees. Along a direction, two parallelograms are formed so that the three new pixels (ul 210, ur 220, and dl 230) are either inside the parallelograms or on the boundaries. The new pixels (ul 210, ur 220, and dl 230) are interpolated using these parallelograms by averaging of pixels at either 4 corner points of a parallelogram, or by averaging pixels at 2 points in the 5 by 5 window. Other pixel selection techniques and calculation techniques may likewise be used. FIGS. 3-12 illustrate the preferred interpolation techniques and calculations for each of the edge directions.

Figure 3:
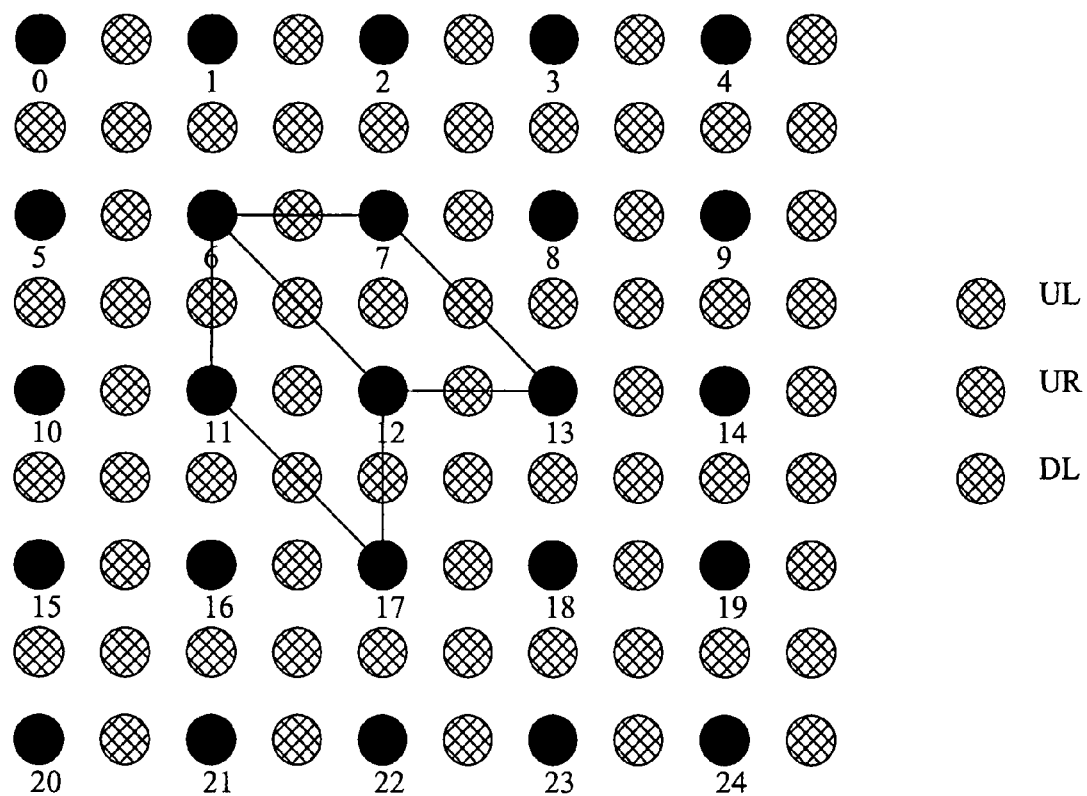
FIG. 3 illustrates an interpolation technique for −45 degrees.

FIG. 3 preferably uses an interpolation as follows:

$p_{ul}=(p_{06}+p_{12})/2$ $p_{dl}=(p_{06}+p_{11}+p_{12}+p_{17})/4$ $p_{ur}=(p_{06}+p_{07}+p_{12}+p_{13})/4$

Figure 4:
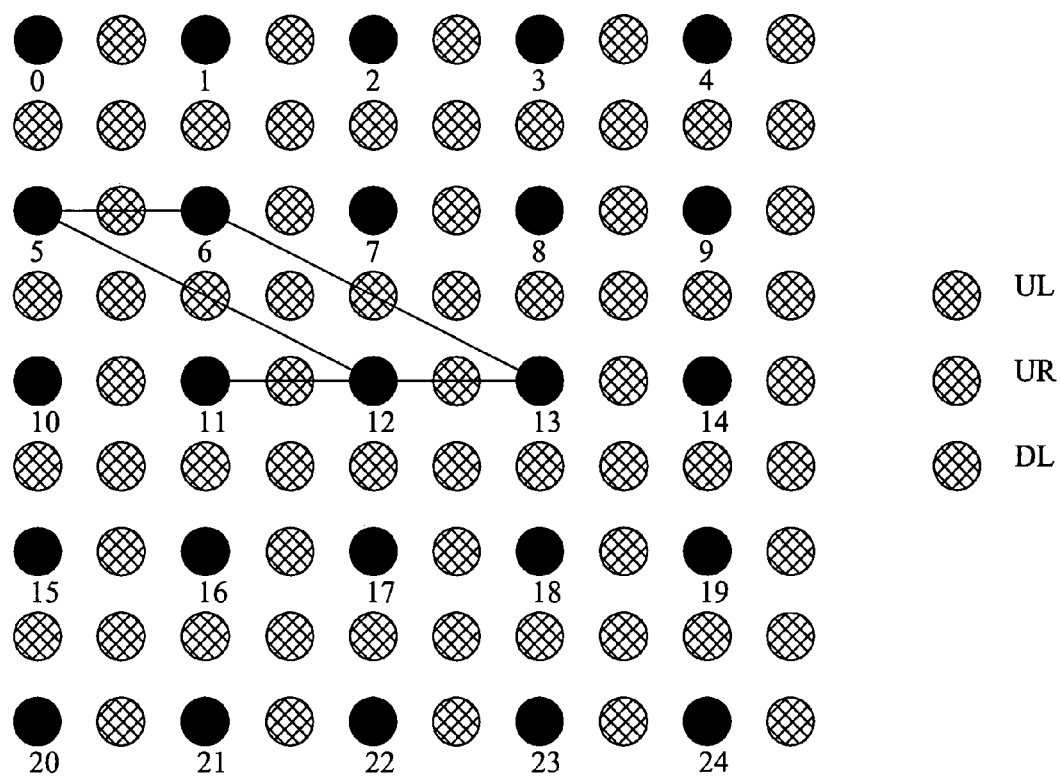
FIG. 4 illustrates an interpolation technique for −26.6 degrees.

FIG. 4 preferably uses an interpolation as follows:

$p_{ul}=(p_{05}+p_{06}+p_{12}+p_{13})/4$ $p_{dl}=(p_{11}+p_{12})/2$ $p_{ur}=(p_{06}+p_{13})/2$

Figure 5:
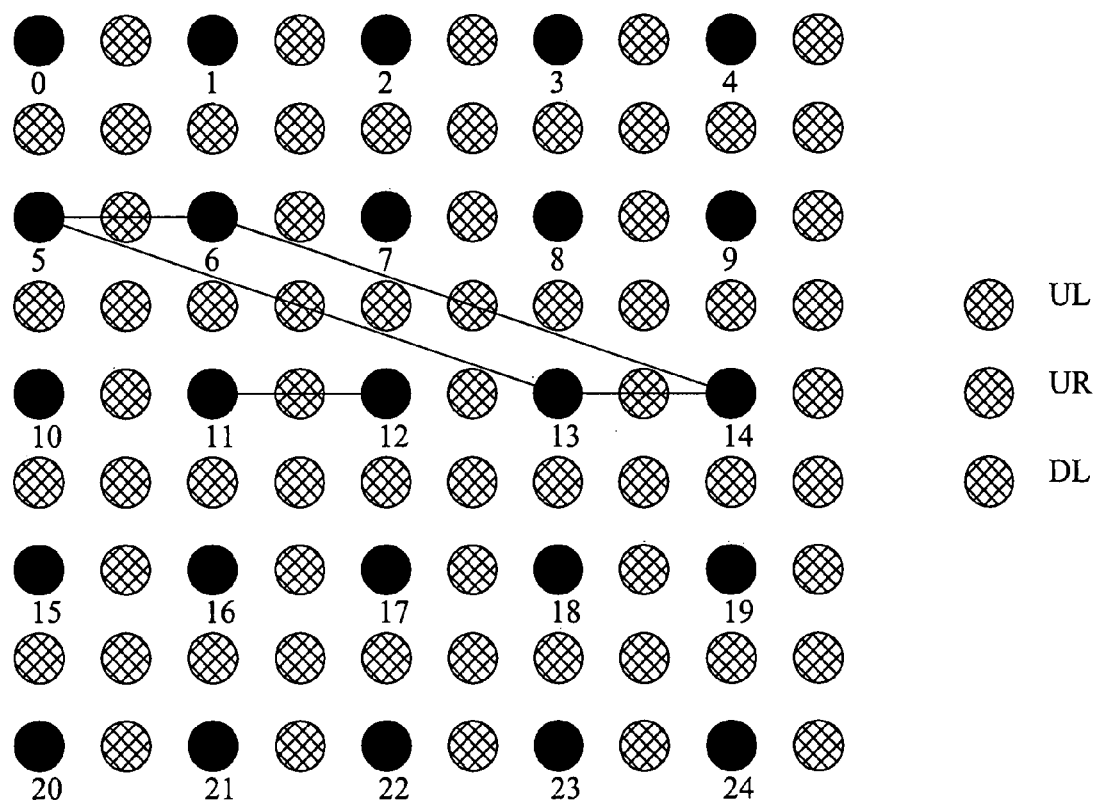
FIG. 5 illustrates an interpolation technique for −18.4 degrees.

FIG. 5 preferably uses an interpolation as follows:

$p_{ul}=(p_{05}+p_{13})/2$ $p_{dl}=(p_{11}+p_{12})/2$ $p_{ur}=(p_{05}+p_{06}+p_{13}+p_{14})/4$

Figure 6:
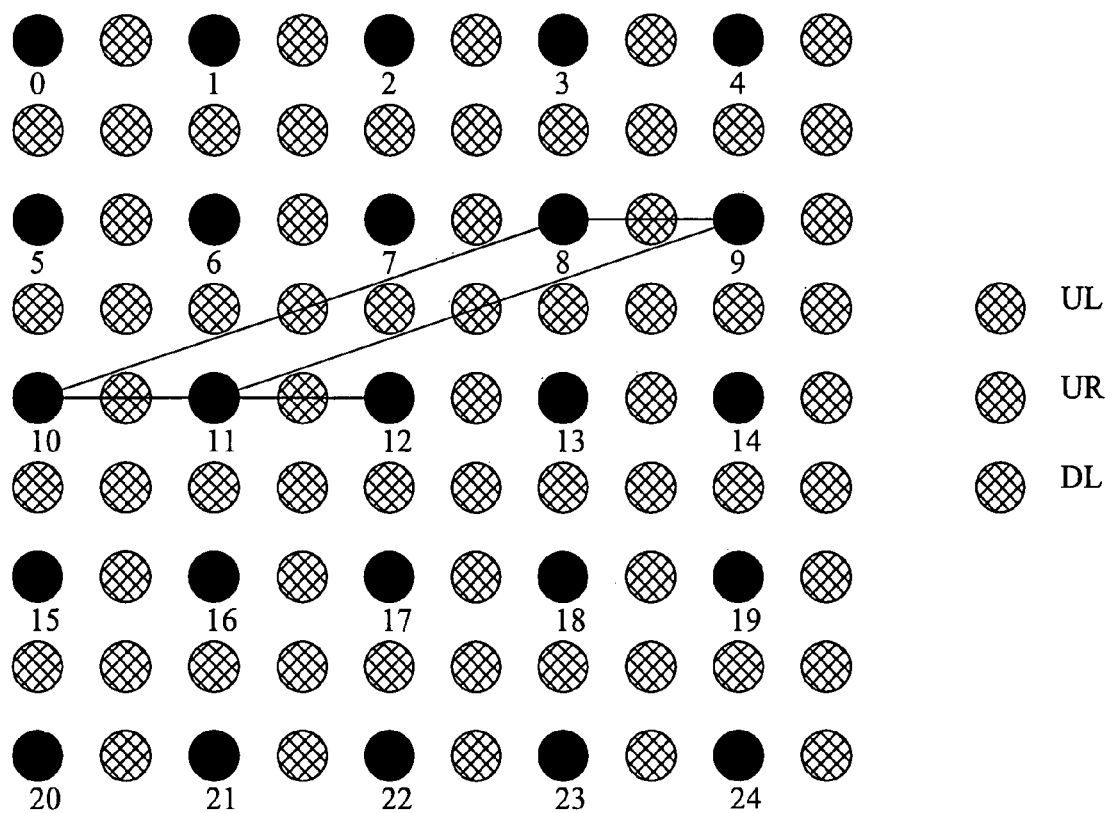
FIG. 6 illustrates an interpolation technique for +18.4 degrees.

FIG. 6 preferably uses an interpolation as follows:

$p_{ul}=(p_8+p_{10})/2$ $p_{dl}=(p_{11}+p_{12})/2$ $p_{ur}=(p_8+p_9+p_{10}+p_{11})/4$

Figure 7:
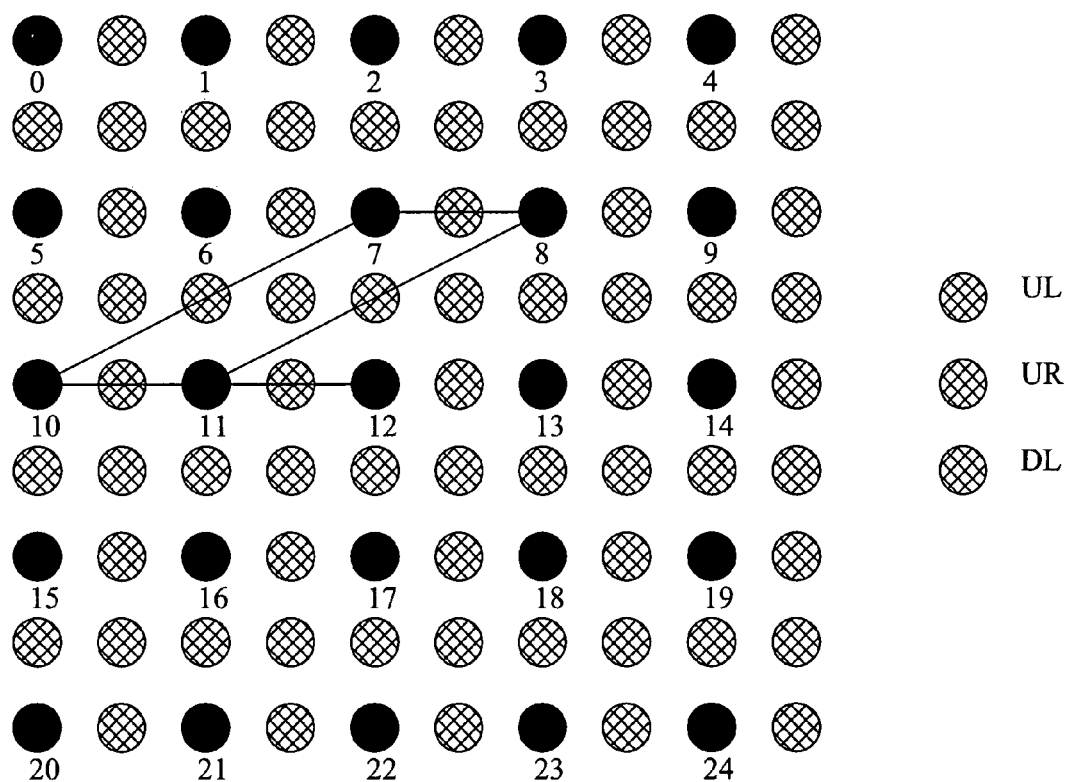
FIG. 7 illustrates an interpolation technique for +26.6 degrees.

FIG. 7 preferably uses an interpolation as follows:

$p_{ul}=(p_7+p_8+p_{10}+p_{11})/4$ $p_{dl}=(p_{11}+p_{12})/2$ $p_{ur}=(p_8+p_{11})/2$

Figure 8:
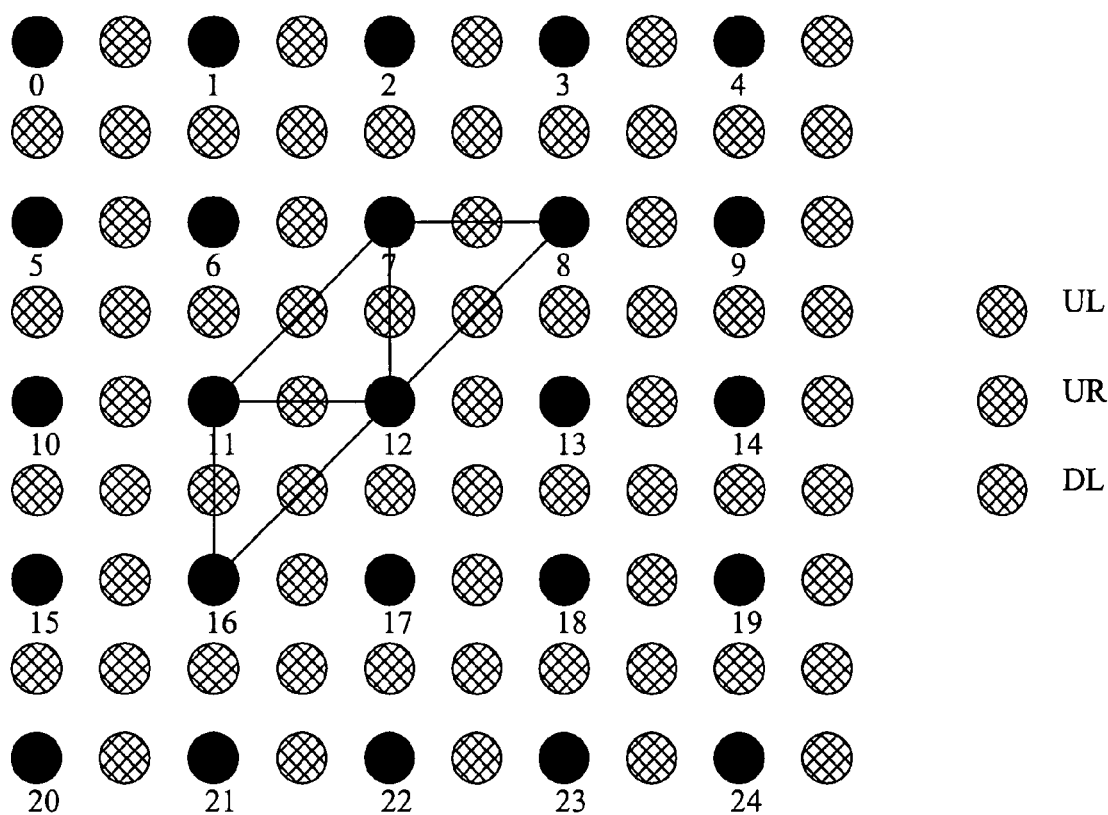
FIG. 8 illustrates an interpolation technique for +45 degrees.

FIG. 8 preferably uses an interpolation as follows:

$p_{ul}=(p_7+p_{11})/2$ $p_{dl}=(p_7+p_{11}+p_{12}+p_{16})/4$ $p_{ur}=(p_7+p_8+p_{11}+p_{12})/4$

Figure 9:
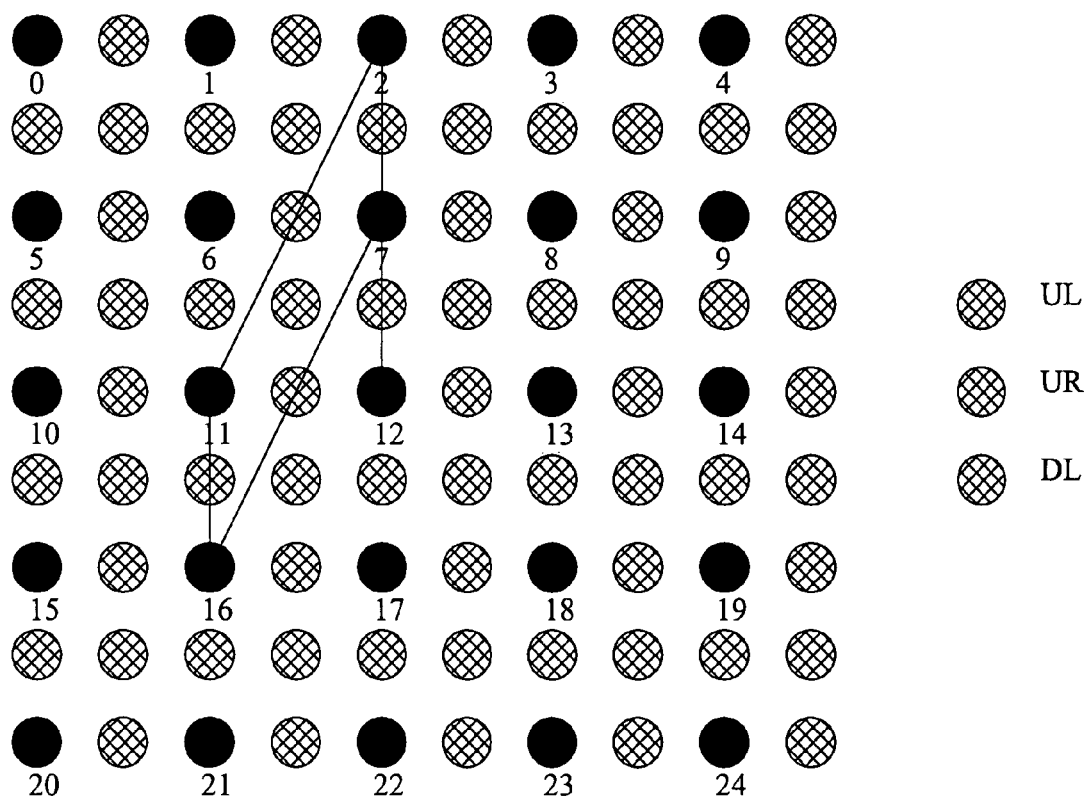
FIG. 9 illustrates an interpolation technique for +63.4 degrees.

FIG. 9 preferably uses an interpolation as follows:

$p_{ul}=(p_{02}+p_7+p_{11}+p_6)/4$ $p_{dl}=(p_7+p_{16})/2$ $p_{ur}=(p_7+p_{12})/2$

Figure 10:
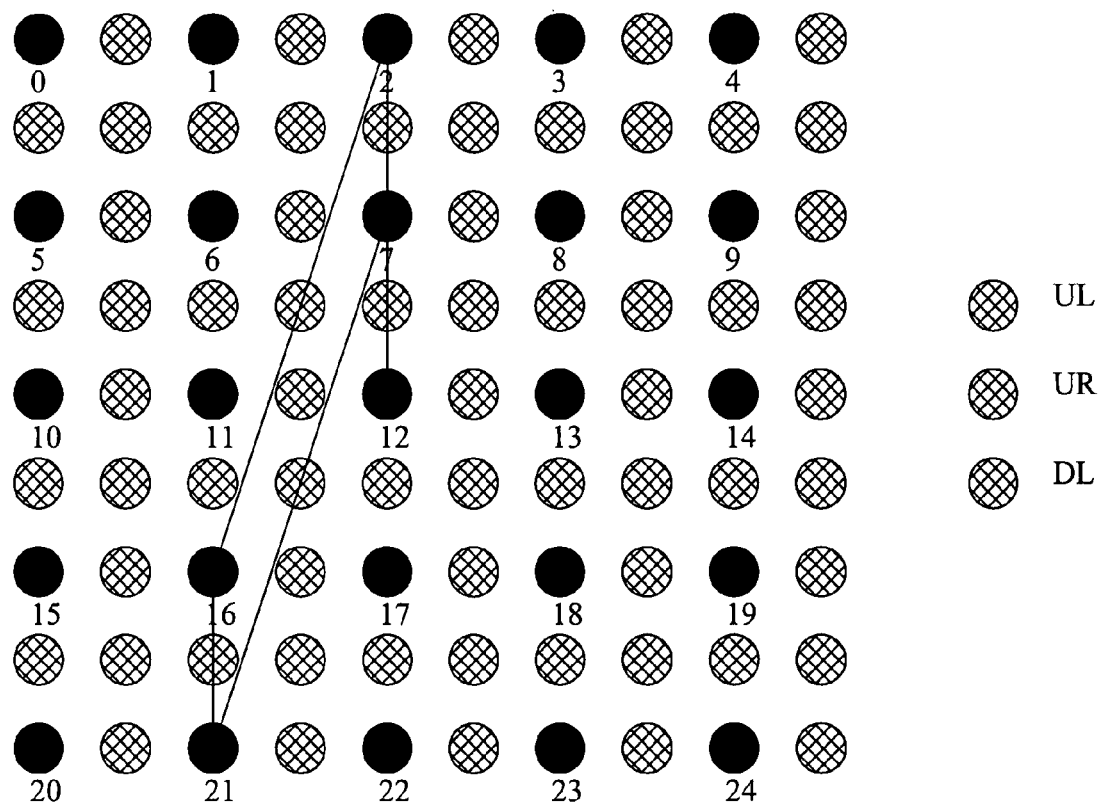
FIG. 10 illustrates an interpolation technique for +71.6 degrees.

FIG. 10 preferably uses an interpolation as follows:

$p_{ul}=(p_2+p_{16})/2$ $p_{dl}=(p_2+p_7+p_{16}+p_{21})/4$ $p_{ur}=(p_7+p_{12})/2$

Figure 11:
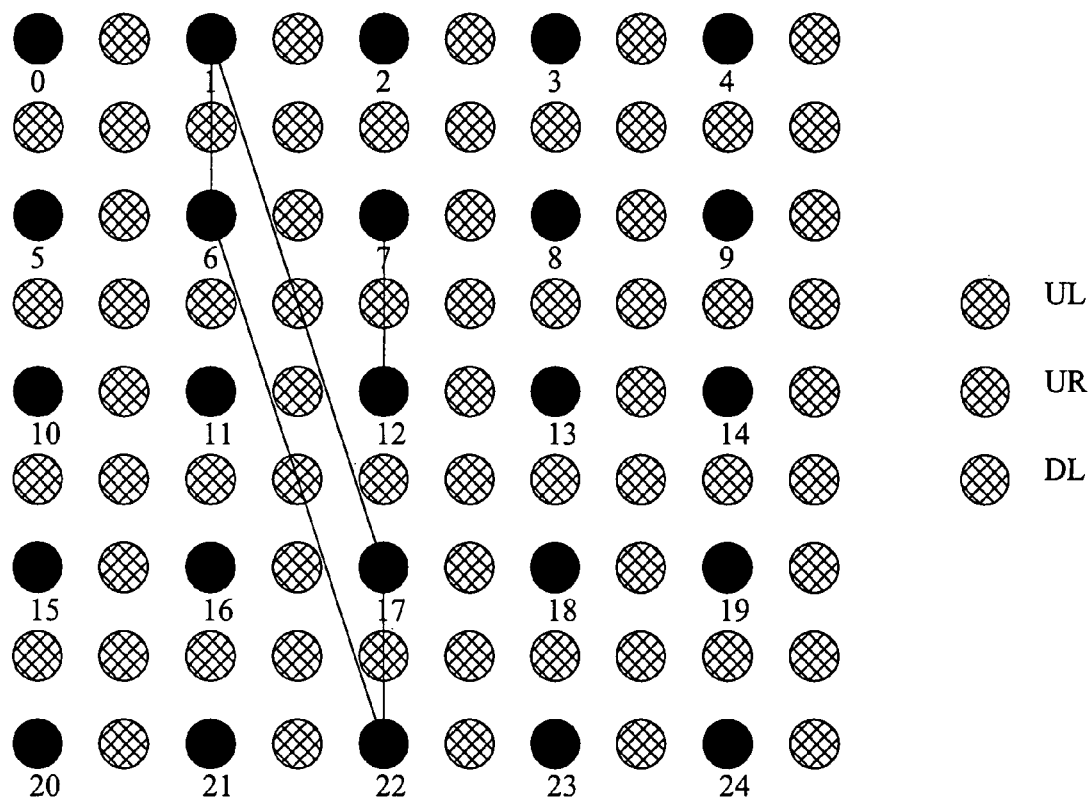
FIG. 11 illustrates an interpolation technique for +108.4 degrees.

FIG. 11 preferably uses an interpolation as follows:

$p_{ul}=(p_1+p_{12})/2$ $p_{dl}=(p_1+p_6+p_{17}+p_{22})/4$ $p_{ur}=(p_7+p_{12})/2$

Figure 12:
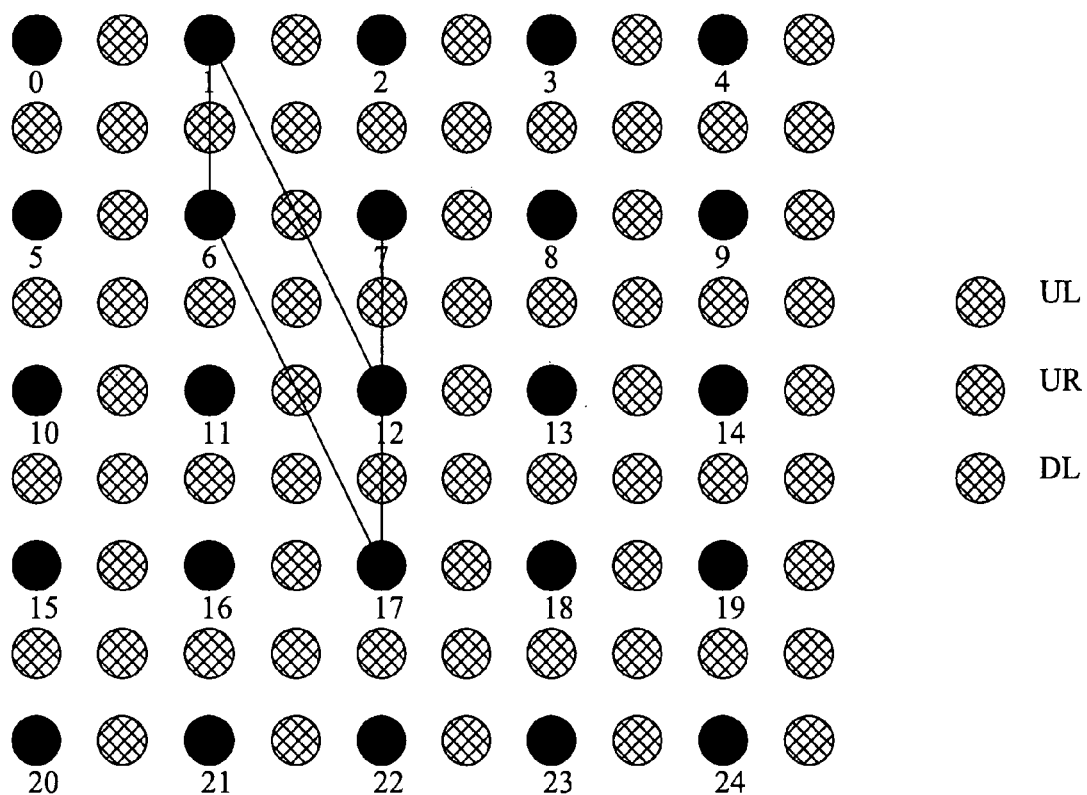
FIG. 12 illustrates an interpolation technique for +116.6 degrees.

FIG. 12 preferably uses an interpolation as follows:

$p_{ul}=(p_1+p_6+p_{12}+p_{17})/4$ $p_{dl}=(p_6+p_{17})/2$ $p_{ur}=(p_{12}+p_7)/2$

Figure 13:
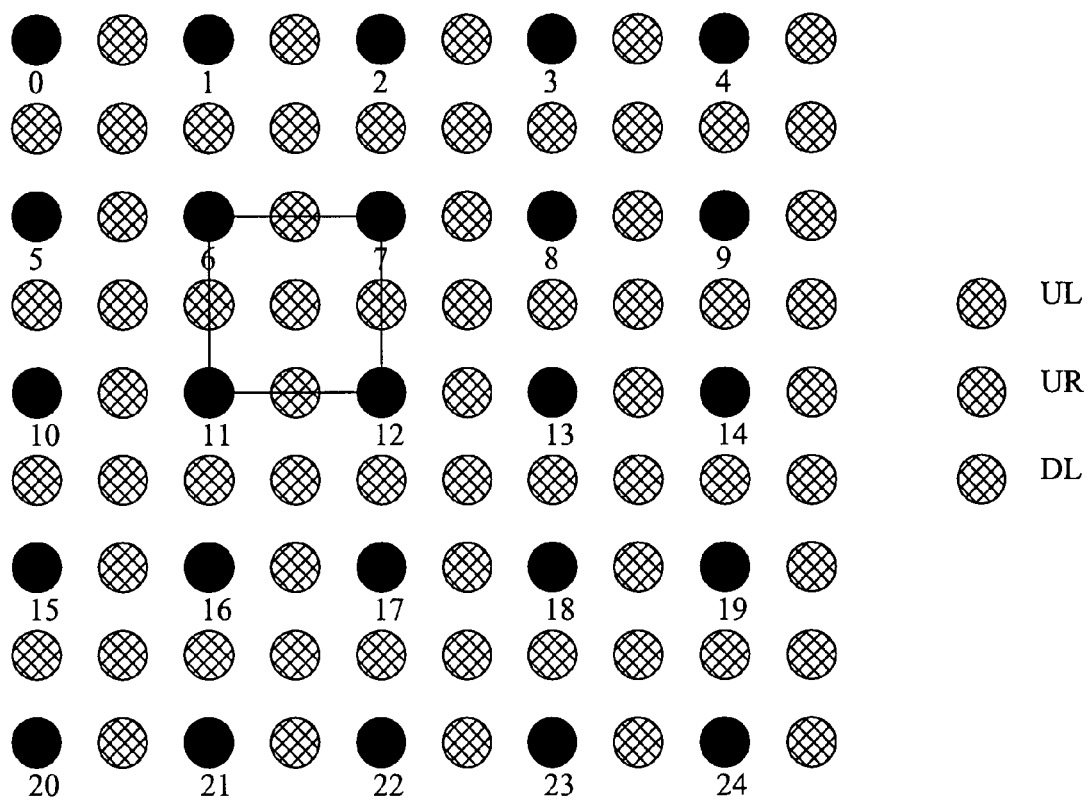
FIG. 13 illustrates an interpolation technique for non-directional.

FIG. 13 preferably uses an interpolation as follows:

$p_{ul}=(p_{06}+p_{07}+p_{11}+p_{12})/4$ $p_{dl}=(p_{11}+p_{12})/2$ $p_{ur}=(p_{07}+p_{12})/2$

The orientation estimation may calculate the image gradient vectors at pixels 6, 7, 8, 11, 12, 13, 16, 17, 18 in the 5×5 window for the central pixel 240. These pixels are the inner 9 pixels of the 5×5 window. Each gradient vector consists of a spatial image derivative in the x direction (horizontal) and a spatial image derivative in the y direction (vertical). In other words, $\text{grad}_i=(\text{gradX}_i, \text{gradY}_i)^T$. The gradient calculation is performed using a pair of spatial derivative operators. The first operator computes the derivative in the x direction, and the second operator computes the derivative in the y direction. For example, the technique may utilize the well-known Sobel operators:

$$y\text{-direction:} \begin{bmatrix} -1 & -2 & 1 \\ 0 & 0 & 0 \\ 1 & 2 & 1 \end{bmatrix} \text{ and } x\text{-direction:} \begin{bmatrix} -1 & 0 & 1 \\ -2 & 0 & 2 \\ -1 & 0 & 1 \end{bmatrix}$$

Other operators may likewise be used and other image derivative operators may likewise be used.

An estimate of the initial orientation direction $\theta_{int}$ may be calculated as follows:

$$\theta_{int} = \underset{\theta}{\operatorname{argmin}} \sum_{i=6,7,8,11,12,13,16,17,18} |gradX_i \cos\theta - gradY_i \sin\theta|$$

$\theta$ tends to assume that the 9 pixels show the same edge orientation (e.g., correlated). Because $\theta$ is quantized into 10 values, the above equation can be readily solved by exhaustive search. In other words, the sum in the above equation only needs to be evaluated 10 times for the 10 defined orientations. The orientation with the minimum value for the sum corresponds to the initial estimate of the orientation.

Note that the above equation is based on taking the sum of absolute values of differences. Other criteria may be used as well, such as the sum of squared differences. However, taking the sum of absolute values as in the above equation is tolerant to outliers and is therefore robust.

The direction estimated by gradient calculation is not always accurate, and therefore the estimate is refined by the orientation refinement 130. The sum of absolute differences for each direction may be defined as follows.

$$Diff[0] = w[0] \cdot \{abs(p_{13} - p_7) + abs(p_{12} - p_6) + abs(p_{11} - p_5) + abs(p_8 - p_2) + \\ abs(p_7 - p_1) + abs(p_6 - p_0) + abs(p_{18} - p_{12}) + \\ abs(p_{17} - p_{11}) + abs(p_{16} - p_{10})\}$$

$$Diff[1] = w[1] \cdot \{abs(p_{13} - p_6) + abs(p_{12} - p_5) + abs(p_{14} - p_7) + \\ abs(p_8 - p_1) + abs(p_7 - p_0) + abs(p_9 - p_2) + \\ abs(p_{18} - p_{11}) + abs(p_{17} - p_{10}) + abs(p_{19} - p_{12})\}$$

$$Diff[2] = w[2] \cdot \{abs(p_{14} - p_6) + abs(p_{13} - p_5) + abs(p_9 - p_3) + \\ abs(p_8 - p_0) + abs(p_{19} - p_{13}) + abs(p_{18} - p_{10})\}$$

$$Diff[3] = w[3] \cdot \{abs(p_{10} - p_8) + abs(p_{11} - p_9) + abs(p_5 - p_3) + \\ abs(p_6 - p_4) + abs(p_{15} - p_{13}) + abs(p_{16} - p_{14})\}$$

$$Diff[4] = w[4] \cdot \{abs(p_{10} - p_7) + abs(p_{11} - p_8) + abs(p_{12} - p_9) + \\ abs(p_5 - p_2) + abs(p_6 - p_3) + abs(p_7 - p_4) + \\ abs(p_{15} - p_{12}) + abs(p_{16} - p_{13}) + abs(p_{17} - p_{14})\}$$

$$Diff[5] = w[5] \cdot \{abs(p_{10} - p_6) + abs(p_{11} - p_7) + abs(p_{12} - p_8) + \\ abs(p_5 - p_1) + abs(p_6 - p_2) + abs(p_7 - p_3) + \\ abs(p_{15} - p_{11}) + abs(p_{16} - p_{12}) + abs(p_{17} - p_{13})\}$$

$$Diff[6] = w[6] \cdot \{abs(p_{11} - p_2) + abs(p_{16} - p_7) + abs(p_{21} - p_{12}) + \\ abs(p_{10} - p_1) + abs(p_{15} - p_6) + abs(p_{20} - p_{11}) + \\ abs(p_{12} - p_3) + abs(p_{17} - p_8) + abs(p_{22} - p_{13})\}$$

$$Diff[7] = w[7] \cdot \{abs(p_{16} - p_2) + abs(p_{21} - p_7) + abs(p_{15} - p_1) + \\ abs(p_{20} - p_6) + abs(p_{17} - p_3) + abs(p_{22} - p_8)\}$$

$$Diff[8] = w[8] \cdot \{abs(p_1 - p_{17}) + abs(p_6 - p_{22}) + abs(p_0 - p_{16}) + \\ abs(p_5 - p_{21}) + abs(p_2 - p_{18}) + abs(p_7 - p_{23})\}$$

$$Diff[9] = w[9] \cdot \{abs(p_{11} - p_{22}) + abs(p_6 - p_{17}) + abs(p_1 - p_{12}) + \\ abs(p_{10} - p_{21}) + abs(p_5 - p_{16}) + abs(p_0 - p_{11}) + \\ abs(p_{12} - p_{23}) + abs(p_7 - p_{18}) + abs(p_2 - p_{13})\}$$

The weights w[n] in the above expressions serve the following purposes:
a. For some of the directions there are fewer terms in the sum of absolute differences compared to other directions. The weights can be used to compensate for this.
b. The weights can be further optimized in order to favor particular directions and discourage other directions. The technique will favor directions with a low weight and discourage directions with a high weight.

From the orientation refinement 130, the technique has computed the index of the initial direction estimate. The technique further compares the sum of absolute differences of index−1, index, and index+1, and picks the lowest one as the refined estimated direction. In other words, the technique computes the values of Diff[index−1], Diff[index], and Diff[index+1], where index corresponds to the index of the initial direction estimate. If Diff[index−1] is the lowest of the three values, then index−1 determines the final direction estimate; otherwise, if Diff[index] is the lowest of the three values, then index determines the final direction estimate; otherwise index+1 determines the final direction estimate.

The following table summarizes the orientation angles that are defined, their index and their preferred weight value.

| Index | Angle | Weight w[.] |
|---|---|---|
| 0 | −45.0 | 1.0 |
| 1 | −26.6 | 1.0 |
| 2 | −18.4 | 1.5 |
| 3 | 18.4 | 1.5 |
| 4 | 26.6 | 1.0 |
| 5 | 45.0 | 1.0 |
| 6 | 63.4 | 1.0 |
| 7 | 71.6 | 1.5 |
| 8 | 108.4 | 1.5 |
| 9 | 116.6 | 1.0 |

If $\theta_{int}$ is the initial interpolation direction, then the technique may compute the reliability indicator 120 of the direction estimation as follows:

$$\alpha = 1 - \frac{\sum_i |gradX_i \cos\theta_{int} - gradY_i \sin\theta_{int}|}{\sum_i |gradX_i \cos(\theta_{int} + \pi/2) - gradY_i (\sin\theta_{int} + \pi/2)|}$$

The value of the reliability indicator $\alpha$ is between 0.0 and 1.0. Note that the numerator of the above expression contains the same sum that was used for the initial direction estimation, while the denominator contains a similar sum based on an angle perpendicular to the estimated $\theta_{int}$. If the image structure is locally highly directional, for example due to the presence of an edge, the numerator tends to be much smaller than the denominator, therefore the second term in the above equation tends to be small values, closer to 0.0, and $\alpha$ tends to be 1. If the image structure does not have any dominant orientation, the numerator and denominator tend to have the same magnitude, therefore α tends to 0.0. This may be the case in a texture area of the image, for example. The computation of the reliability indicator may be suitably modified to handle the case where the denominator is very close to 0.0. Furthermore, the above reliability indicator may alternatively be computed based on sums of squared differences instead of sums of absolute differences.

As previously explained, the value of α is used in the interpolation technique to compute the final value of interpolated pixels.

The fallback interpolation 160 may use any suitable technique, such as single bi-linear, or single bi-cubic, and preferably a technique that doesn't involve an edge determination. Referring to FIG. 13, an interpolation technique for ul 210, ur 220, and dl 230 is illustrated.

The technique also defines a set of coefficients for a fallback non-directional interpolation. When the edge orientation is estimated, a scalar, α, between 0 and 1 is also computed to indicate the reliability of the estimation. Eventually, the results from the directional interpolation and the non-directional interpolation is blended together based on α. The fallback interpolation and the directional interpolated results are blended together by a scalar α 120. Let $p^d$ denote the result of the directional interpolation, and let $p^n$ denote the result of the non-directional fallback interpolation for pixel p. This applies to any of the new pixels that are interpolated, i.e. pixels ul 210, ur 220 and dl 230. Then, the final interpolated pixel value $p^f$ is defined by $$p^f = \alpha \cdot p^d + (1-\alpha) \cdot p^n.$$

The technique restricts all the computation within the 5×5 window, and does not use iteration.

A non-iteration based technique reduces buffering and reduces the necessary calculation speed for a hardware based implementation. The technique generates the upscaled output image in a single pass over the input image. After the interpolated pixels are calculated from the input pixels, no further operations are performed in the output image.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for up-scaling an image, said method comprising:
    (a) receiving an input image having a plurality of pixels;
    (b) estimating a discretely quantified edge direction proximate a first pixel of said input image using a plurality of discretely quantified predetermined potential directions, each of said plurality of predetermined potential directions having a nonzero vertical component and a nonzero horizontal component;
    (c) selectively refining the discretely quantified estimated said edge direction proximate said first pixel of said input image;
    (d) interpolating a first set of new pixels proximate said first pixel using a first technique, and based upon a selected edge direction of: (i) the discretely quantified estimated said edge direction; and (ii) the selectively refined said discretely quantified estimated edge direction;
    (e) interpolating a second set of new pixels proximate said first pixel based upon another technique, different from said first technique;
    (f) interpolating a final set of new pixels for an output image having more pixels than said input image based upon at least one selected set of new pixels from step (d) and/or step (e).

2. The method of claim 1 wherein said estimating is based upon a gradient.

3. The method of claim 1 wherein said estimating is based upon a 5 by 5 pixel window.

4. The method of claim 1 wherein said estimating is performed upon a majority of said plurality of pixels of said image.

5. The method of claim 1 wherein said estimating is based upon the luminance of said image.

6. The method of claim 1 further comprising determining a reliability measure that the selected edge direction is suitable.

7. The method of claim 6 wherein said reliability measure is a weighted reliability measure.

8. The method of claim 1 wherein said selecting is based upon 3 directions.

9. The method of claim 1 wherein said selecting is based upon the next closest direction to the direction of said estimating.

10. The method of claim 1 wherein neither step (d) nor step (e) includes iterations.

11. The method of claim 1 wherein said plurality of predetermined directions is comprised of: −45 degrees, −26.6 degrees, −18.4 degrees, 18.4 degrees, 26.6 degrees, 45 degrees, 63.4 degrees, 71.6 degrees, 108.4 degrees and 116.6 degrees, all modulo 180 degrees.

12. The method of claim 1 wherein said estimating of said edge direction is based on a plurality of pixels proximate said first pixel.

13. The method of claim 1 wherein said selecting is based upon the pixels in a 5 by 5 window centered around said first pixel.

14. The method of claim 1 wherein all interpolation is based upon the pixels in a 5 by 5 window centered around said first pixel.

15. The method of claim 1 wherein said estimating, selecting and determining is based upon the pixels in a 5 by 5 window centered around said first pixel.

16. The method of claim 6 wherein said determining of said interpolated pixels is based on said reliability measure.

17. The method of claim 16 wherein said interpolated pixels based upon said selected edge direction are weighed using said reliability measure.

18. The method of claim 16 wherein said interpolated pixels based upon said other technique are weighed using said reliability measure.

19. The method of claim 1, wherein said interpolating pixels based upon said selected edge direction is based on pixels in the input image that are near the pixel to be interpolated and near a line through that pixel with an orientation equal to said selected edge direction.

20. The method of claim 19 wherein said interpolating pixels based upon said selected edge direction is based on either 2 pixels in the input image or 4 pixels in the input image.

* * * * *